(12) United States Patent
Thomson

(10) Patent No.: US 9,188,982 B2
(45) Date of Patent: Nov. 17, 2015

(54) METHOD AND APPARATUS FOR EFFICIENT SCHEDULING FOR MULTIPLE AUTOMATED NON-HOLONOMIC VEHICLES USING A COORDINATED PATH PLANNER

(75) Inventor: Jacob Jay Thomson, Auckland (NZ)

(73) Assignee: Crown Equipment Limited, East Tamaki, Auckland (NZ)

( * ) Notice: Subject to any disclaimer, the term of this patent is extended or adjusted under 35 U.S.C. 154(b) by 0 days.

(21) Appl. No.: 14/110,950

(22) PCT Filed: Apr. 10, 2012

(86) PCT No.: PCT/NZ2012/000051
§ 371 (c)(1),
(2), (4) Date: Oct. 10, 2013

(87) PCT Pub. No.: WO2012/141601
PCT Pub. Date: Oct. 18, 2012

(65) Prior Publication Data
US 2014/0032035 A1 Jan. 30, 2014

Related U.S. Application Data

(60) Provisional application No. 61/474,030, filed on Apr. 11, 2011.

(51) Int. Cl.
*G05D 1/00* (2006.01)
*G05D 1/02* (2006.01)

(52) U.S. Cl.
CPC ............ *G05D 1/0212* (2013.01); *G05D 1/0274* (2013.01); *G05D 1/0289* (2013.01); *G05D 1/0291* (2013.01); *G05D 1/0297* (2013.01); *G05D 2201/0216* (2013.01)

(58) Field of Classification Search
None
See application file for complete search history.

(56) References Cited

U.S. PATENT DOCUMENTS 4,043,418 A 8/1977 Blakeslee
4,071,740 A 1/1978 Gogulski
(Continued)

FOREIGN PATENT DOCUMENTS

DE 19757333 C1 9/1999
DE 10220936 A1 12/2003
(Continued)

OTHER PUBLICATIONS

Chao Yong and Eric J. Barth -Real-Time Dynamic Path Planning for Dubins Nonholonomic Robot -Published Dec. 13-15, 2006. Accessed from: http://ieeexplore.ieee.org/xpl/articleDetails.jsp?arnumber=4177899 on Sep. 17, 2014.*
(Continued)

*Primary Examiner* — John R Olszewski
*Assistant Examiner* — Jess Whittington
(74) *Attorney, Agent, or Firm* — Dinsmore & Shohl LLP

(57) ABSTRACT

A method for coordinating path planning for one or more automated vehicles is described, including receiving an executable task for an automated vehicle, providing a multi-level graph comprising high-level nodes, connection nodes, roadmap nodes, and one or more local paths, constructing a grid corresponding with the multi-level graph, selecting grid squares corresponding to a start position, a goal position, or both if they are off the multi-level graph, determining joining paths from the start position, goal position, or both to the multi-level graph, constructing a solution set of roadmap graphs from the multi-level graph, selecting a coordinate path plan, communicating at least a portion of the coordinate path plan to each automated vehicle, and controlling the automated vehicle in accordance with the coordinate path plan.

21 Claims, 4 Drawing Sheets

(56) References Cited

U.S. PATENT DOCUMENTS

| | | |
|---|---|---|
| 4,530,056 A | 7/1985 | MacKinnon et al. |
| 4,782,920 A | 11/1988 | Gaibler et al. |
| 4,855,915 A | 8/1989 | Dallaire |
| 4,858,132 A | 8/1989 | Holmquist |
| 4,996,468 A | 2/1991 | Field et al. |
| 5,011,358 A | 4/1991 | Andersen et al. |
| 5,051,906 A | 9/1991 | Evans, Jr. et al. |
| 5,170,352 A | 12/1992 | McTamaney et al. |
| 5,202,832 A | 4/1993 | Lisy |
| 5,208,753 A | 5/1993 | Acuff |
| 5,283,739 A | 2/1994 | Summerville et al. |
| 5,471,393 A | 11/1995 | Bolger |
| 5,491,670 A | 2/1996 | Weber |
| 5,539,638 A | 7/1996 | Keeler et al. |
| 5,568,030 A | 10/1996 | Nishikawa et al. |
| 5,586,620 A | 12/1996 | Dammeyer et al. |
| 5,612,883 A | 3/1997 | Shaffer et al. |
| 5,646,845 A | 7/1997 | Gudat et al. |
| 5,682,317 A | 10/1997 | Keeler et al. |
| 5,911,767 A | 6/1999 | Garibotto et al. |
| 5,916,285 A | 6/1999 | Alofs et al. |
| 5,938,710 A * | 8/1999 | Lanza et al. ................ 701/50 |
| 5,941,935 A | 8/1999 | Fernandez |
| 5,961,571 A | 10/1999 | Gorr et al. |
| 6,012,003 A | 1/2000 | Astrom |
| 6,092,010 A | 7/2000 | Alofs et al. |
| 6,122,572 A | 9/2000 | Yavnai |
| 6,208,916 B1 | 3/2001 | Hori |
| 6,246,930 B1 | 6/2001 | Hori |
| 6,269,291 B1 | 7/2001 | Segeren |
| 6,285,951 B1 | 9/2001 | Gaskins et al. |
| 6,295,503 B1 | 9/2001 | Inoue et al. |
| 6,308,118 B1 | 10/2001 | Homquist |
| 6,325,749 B1 | 12/2001 | Inokuchi et al. |
| 6,461,355 B2 | 10/2002 | Svejkovsky et al. |
| 6,470,300 B1 | 10/2002 | Benzinger et al. |
| 6,493,614 B1 | 12/2002 | Jung |
| 6,539,294 B1 | 3/2003 | Kageyama |
| 6,641,355 B1 | 11/2003 | McInerney et al. |
| 6,816,085 B1 | 11/2004 | Haynes et al. |
| 6,842,692 B2 | 1/2005 | Fehr et al. |
| 6,917,839 B2 | 7/2005 | Bickford |
| 6,922,632 B2 | 7/2005 | Foxlin |
| 6,934,615 B2 | 8/2005 | Flann et al. |
| 6,952,488 B2 | 10/2005 | Kelly et al. |
| 7,015,831 B2 | 3/2006 | Karlsson et al. |
| 7,076,336 B2 | 7/2006 | Murray, IV et al. |
| 7,147,147 B1 | 12/2006 | Enright et al. |
| 7,148,458 B2 | 12/2006 | Schell et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,246,007 B2 | 7/2007 | Ferman |
| 7,272,467 B2 | 9/2007 | Goncalves et al. |
| 7,305,287 B2 | 12/2007 | Park |
| 7,343,232 B2 | 3/2008 | Duggan et al. |
| 7,386,163 B2 | 6/2008 | Sabe et al. |
| 7,451,021 B2 | 11/2008 | Wilson |
| 7,451,030 B2 | 11/2008 | Eglington et al. |
| 7,499,796 B2 | 3/2009 | Listle et al. |
| 7,539,563 B2 | 5/2009 | Yang et al. |
| 7,610,123 B2 | 10/2009 | Han et al. |
| 7,646,336 B2 | 1/2010 | Tan et al. |
| 7,650,231 B2 | 1/2010 | Gadler |
| 7,679,532 B2 | 3/2010 | Karlsson et al. |
| 7,688,225 B1 | 3/2010 | Haynes et al. |
| 7,689,321 B2 | 3/2010 | Karlsson |
| 7,720,554 B2 | 5/2010 | DiBernardo et al. |
| 7,734,385 B2 | 6/2010 | Yang et al. |
| 7,739,006 B2 | 6/2010 | Gillula |
| 7,844,364 B2 | 11/2010 | McLurkin et al. |
| 7,996,097 B2 | 8/2011 | DiBernardo et al. |
| 8,020,657 B2 | 9/2011 | Allard et al. |
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,271,069 B2 | 9/2012 | Jascob et al. |
| 8,280,623 B2 | 10/2012 | Trepagnier et al. |
| 8,296,065 B2 | 10/2012 | Haynie et al. |
| 8,538,577 B2 | 9/2013 | Bell et al. |
| 2002/0049530 A1 | 4/2002 | Poropat |
| 2004/0030493 A1 | 2/2004 | Pechatnikov et al. |
| 2004/0202351 A1 | 10/2004 | Park et al. |
| 2004/0249504 A1 | 12/2004 | Gutmann et al. |
| 2005/0075116 A1 | 4/2005 | Laird et al. |
| 2005/0080524 A1 * | 4/2005 | Park ................................ 701/23 |
| 2005/0140524 A1 | 6/2005 | Kato et al. |
| 2005/0149256 A1 | 7/2005 | Lawitzky et al. |
| 2005/0182518 A1 | 8/2005 | Karlsson |
| 2005/0234679 A1 | 10/2005 | Karlsson |
| 2005/0244259 A1 | 11/2005 | Chilson et al. |
| 2005/0246078 A1 | 11/2005 | Vercammen |
| 2006/0095170 A1 | 5/2006 | Yang et al. |
| 2006/0181391 A1 | 8/2006 | McNeill et al. |
| 2006/0184013 A1 | 8/2006 | Emanuel et al. |
| 2007/0027612 A1 * | 2/2007 | Barfoot et al. ................ 701/117 |
| 2007/0050088 A1 | 3/2007 | Murray, IV et al. |
| 2007/0061043 A1 | 3/2007 | Ermakov et al. |
| 2007/0090973 A1 | 4/2007 | Karlsson et al. |
| 2007/0106465 A1 * | 5/2007 | Adam et al. ................. 701/209 |
| 2007/0150097 A1 | 6/2007 | Chae et al. |
| 2007/0153802 A1 | 7/2007 | Anke et al. |
| 2007/0213869 A1 | 9/2007 | Bandringa et al. |
| 2007/0244640 A1 | 10/2007 | Hirokawa |
| 2007/0262884 A1 | 11/2007 | Goncalves et al. |
| 2008/0015772 A1 | 1/2008 | Sanma et al. |
| 2008/0046170 A1 | 2/2008 | DeGrazia |
| 2008/0167817 A1 | 7/2008 | Hessler et al. |
| 2008/0199298 A1 | 8/2008 | Chilson et al. |
| 2008/0272193 A1 | 11/2008 | Silverbrook et al. |
| 2009/0005986 A1 | 1/2009 | Soehren |
| 2009/0012667 A1 | 1/2009 | Matsumoto et al. |
| 2009/0140887 A1 | 6/2009 | Breed et al. |
| 2009/0198371 A1 | 8/2009 | Emanuel et al. |
| 2009/0216438 A1 | 8/2009 | Shafer |
| 2009/0306946 A1 * | 12/2009 | Badler et al. ...................... 703/2 |
| 2010/0021272 A1 | 1/2010 | Ward et al. |
| 2010/0023257 A1 | 1/2010 | Machino |
| 2010/0161224 A1 | 6/2010 | Lee et al. |
| 2010/0222925 A1 | 9/2010 | Anezaki |
| 2010/0256908 A1 | 10/2010 | Shimshoni et al. |
| 2010/0268697 A1 | 10/2010 | Karlsson et al. |
| 2010/0286905 A1 | 11/2010 | Goncalves et al. |
| 2010/0286908 A1 * | 11/2010 | Tate et al. ................... 701/209 |
| 2010/0312386 A1 * | 12/2010 | Chrysanthakopoulos et al. ................................ 700/246 |
| 2011/0010023 A1 * | 1/2011 | Kunzig et al. ..................... 701/2 |
| 2011/0085426 A1 | 4/2011 | Kwon et al. |
| 2011/0121068 A1 | 5/2011 | Emanuel et al. |
| 2011/0125323 A1 | 5/2011 | Gutmann et al. |
| 2011/0148714 A1 | 6/2011 | Schantz et al. |
| 2011/0150348 A1 | 6/2011 | Anderson |
| 2011/0153338 A1 | 6/2011 | Anderson |
| 2011/0216185 A1 | 9/2011 | Laws et al. |
| 2011/0218670 A1 | 9/2011 | Bell et al. |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 | 7/2012 | Andersen et al. |
| 2012/0287280 A1 | 11/2012 | Essati et al. |
| 2012/0323431 A1 | 12/2012 | Wong et al. |
| 2013/0006420 A1 | 1/2013 | Karlsson et al. |
| 2013/0101230 A1 | 4/2013 | Holeva et al. |
| 2013/0275045 A1 | 10/2013 | Tsujimoto et al. |
| 2014/0350831 A1 * | 11/2014 | Hoffman et al. .............. 701/117 |

FOREIGN PATENT DOCUMENTS

| | | |
|---|---|---|
| DE | 10234730 A1 | 2/2004 |
| DE | 102007021693 A1 | 11/2008 |
| EP | 0508793 A2 | 10/1992 |

(56) References Cited

FOREIGN PATENT DOCUMENTS

| | | |
|---|---|---|
| EP | 1 034 984 A2 | 9/2000 |
| EP | 1201536 A2 | 5/2002 |
| EP | 1732247 A1 | 12/2006 |
| EP | 1995206 A1 | 11/2008 |
| GB | 2389947 A | 12/2003 |
| JP | 52-066260 | 6/1977 |
| JP | 60067818 | 4/1985 |
| JP | 2000255716 B1 | 9/2000 |
| JP | 2002048579 | 2/2002 |
| JP | 2002108446 | 4/2002 |
| JP | 2005114546 | 4/2005 |
| KR | 10-0814456 B3 | 3/2008 |
| WO | 01/67749 A2 | 9/2001 |
| WO | 02083546 A1 | 10/2002 |
| WO | 03042916 A1 | 5/2003 |
| WO | 03096052 A2 | 11/2003 |
| WO | 2004015510 A1 | 2/2004 |
| WO | 2005068272 A2 | 7/2005 |
| WO | 2006/128124 A2 | 11/2006 |
| WO | 2011044298 A2 | 4/2011 |
| WO | 2011085426 A1 | 7/2011 |
| WO | 2012166970 A1 | 12/2012 |

OTHER PUBLICATIONS

Guizzo, "Three Engineer Hundres of Robots One Warehouse", Spectrum IEEE, vol. 45, Issue 7, pp. 26-34, Jul. 2008.
Written Opinion of the International Searching Authority, mailed Nov. 30, 2011 for PCT Application No. PCT/NZ2011/000025.
Borenstein et al., "Mobile Robot Positioning-Sensors and Techniques", Journal of Robotic Systems, Special Issue on Mobile Robots, vol. 14, No. 4, pp. 231-249, Apr. 1997.
Harmon et al., "A Technique for Coordinating Autonomous Robots", Autonomous Systems Branch Naval Ocean Systems Center San Diego, CA 92152, 1986.
Jensfelt et al., "Laser Based Position Acquisition and Tracking in an Indoor Environment", Proc. Inst. Symp. Robotics and Automation, 1998.
Siadat et al., "An Optimized Segmentation Method for a 2D Laser-Scanner Applied to Mobile Robot Navigation", Proceedings of the 3rd IFAS Symposium on Intelligent Components and Instruments for Control Applications, 1997.
Office Action pertaining to U.S. Appl. No. 13/159,500 dated Mar. 26, 2013.
Office Action pertaining to U.S. Appl. No. 13/219,271 dated Feb. 25, 2013.
Office Action pertaining to U.S. Appl. No. 13/153,743 dated Mar. 4, 2013.
Office Action pertaining to U.S. Appl. No. 13/159,501 dated Jan. 10, 2013.
Office Action pertaining to U.S. Appl. No. 12/948,358 dated Apr. 8, 2013.
International Search Report and Written Opinion pertaining to International Patent Application No. PCT/NZ2012/000084 dated Jan. 30, 2013.
International Search Report and Written Opinion pertaining to International Patent Application No. PCT/NZ2012/000051 dated Jan. 2, 2013.
International Search Report and Written Opinion pertaining to International Patent Application No. PCT/NZ2012/000091 dated Oct. 31, 2013.
International Search Report and Written Opinion pertaining to International Patent Application No. PCT/US2012/054062 dated Nov. 27, 2012.
International Search Report and Written Opinion pertaining to International Patent Application No. PCT/US2012/052247 dated Nov. 27, 2012.
International Search Report and Written Opinion pertaining to International Patent Application No. PCT/NZ2011/000024 dated Dec. 7, 2011.
Office Action (Final Rejection) pertaining to U.S. Appl. No. 12/660,616 dated Nov. 27, 2012.
Office Action pertaining to U.S. Appl. No. 13/672,260 dated May 8, 2013.
Office Action pertaining to U.S. Appl. No. 13/159,501 dated Jun. 4, 2013.
Office Action pertaining to U.S. Appl. No. 13/227,165 dated Jul. 12, 2013.
Office Action pertaining to U.S. Appl. No. 12/718,620 dated May 21, 2013.
Azizi et al., "Mobile Robot Position Determination", Recent Advances in Mobile Robotics, Dr. Andon Topalov (Ed.), ISBN: 978-953-307-909-7, In Tech, Available from: http://www.intechopen.com/books/recent-advances-in-mobile-robotics/mobile-robot-position-determination, pp. 737-742.
Feng et al., "Model-based calibration for sensor networks", Proceedings of IEEE, vol. 2, pp. 737-742, Print ISBN: 0-7803-8133-5, Sensors, 2003.
Ibanez-Guzman et al., "Unmanned Tracked Ground Vehicle for Natural Environments", Nanyang Technological University, School of Computer Science, Sinapore, 9 pages.
Xia et al., "Vision-Based Global Localization for Intelligent Vehicles", Research Institute of Robotics, Automation Department, Shanghao Jiao Tong University, P.R. China, Intelligent Vehicles Symposium in Tokyo Japan, Jun. 13-15, 2006, 6 pages.
Office Action pertaining to U.S. Appl. No. 12/948,358 dated Aug. 24, 2012.
Office Action pertaining to U.S. Appl. No. 12/948,358 dated Apr. 5, 2012.
Office Action pertaining to U.S. Appl. No. 13/116,600 dated Dec. 31, 2012.
Office Action pertaining to U.S. Appl. No. 13/300,041 dated Sep. 19, 2013.
Notice of Allowance pertaining to U.S. Appl. No. 13/300,041 dated Dec. 16, 2013.
Communication pursuant to Rules 161(1) and 162 EPC dated Apr. 17, 2014 pertaining to European Application No. 12773426.7.
Australian first examination report pertaining to Australian patent application No. 2012304464, dated Jul. 23, 2014.
Korean Notice of Preliminary Rejection dated May 1, 2014, for Korean Application No. 10-2014-7000894.
Australian Examination Report dated Jun. 13, 2014, for Australian Application No. 2011221652.
Office Action dated Jun. 4, 2014, for U.S. Appl. No. 13/672,391.
Australian Examination Report dated May 1, 2014, for Australian Application No. 2012300353.
Australian Examination Report dated May 14, 2014, for Australian Application No. 2012259536.
Australian Examination Report dated Jun. 5, 2014, for Australian Application No. 2012243484.
Korean Preliminary Rejection dated Aug. 29, 2014 pertaining to the Korean Application No. 10-2014-7000140.
Extended European Search Report dated May 9, 2014 pertaining to European Application No. 11750974.5.
European Search Report for Application No. 12770733.9 dated Sep. 1, 2014.
Thomson et al., "Efficient Scheduling for Multiple Automated Non-Holonomic Vehicles using a Coordinated Path Planner", IEEE International Conference on Robotics and Automation (ICRA), , pp. 1-4, May 9, 2011.

* cited by examiner

US 9,188,982 B2

METHOD AND APPARATUS FOR EFFICIENT SCHEDULING FOR MULTIPLE AUTOMATED NON-HOLONOMIC VEHICLES USING A COORDINATED PATH PLANNER

BACKGROUND OF THE INVENTION

1. Technical Field

Embodiments of the present disclosure generally relate to a vehicle management system and, more particularly, to a method and apparatus for efficient scheduling for multiple automated non-holonomic vehicles using a coordinated path planner.

2. Description of the Related Art

Automated Vehicles (AVs) operate in mixed-use, multivehicle, dynamic warehouse environments. The nature of this environment can cause automated vehicles to become impeded by unknown obstacles or situations as they go about the execution of tasks. This delay causes any a priori planning to become obsolete as the interaction of automated vehicles may cause deadlocks, and time critical tasks become at risk for completion. Factors including overall driving time, vehicle constraints such as non-holonomic motion and fuel usage also impact planning. These problems have motivated the development and implementation of the presented scheduling solution using coordinated paths for multiple vehicles.

Although research into multi-vehicle path planning is not a new topic, for example, a coordinated approached is used in constraining robots to defined roadmaps resulting in a complete and relatively fast solution, a near-optimal multi-vehicle approach for non-holonomic vehicles focuses on continuous curve paths that avoid moving obstacles and are collision free is not available. Even though these solutions are useful, the problem consideration is not broad enough to be used directly within the targeted industrial environment. There may be requirements to have high utilization of resources and throughput of product. Current approaches used to solve the planning and scheduling problem, particularly with multiple vehicles have often been too limited in scope to address and attempt to optimize solutions.

Therefore, there is a need in the art for a method and apparatus for efficient scheduling of multiple non-holonomic automated vehicles using coordinated path planning.

SUMMARY

A method for coordinating path planning for one or more automated vehicles is described, including querying an online path planner for possible solutions for at least one executable task for each of the one or more automated vehicles, examining the results of the query, deciding a coordinated path plan for each vehicle, and communicating the coordinated path plan to a traffic manager, wherein the traffic manager ensures that the one or more automated vehicles perform each executable task according to the coordinated path plan.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Given a set of objectives, such as moving product around a warehouse, various embodiments of a method and apparatus for efficient scheduling of multiple non-holonomic automated vehicles using coordinated path planning finds a solution that optimizes resource utilization while meeting current and future task deadlines according to some embodiments. An objective can be defined for the optimization including terms for maneuvering speeds, fuel usage, and upcoming tasks locations. The speed at which planning solutions are found allows many different possibilities for current and future objectives to be evaluated enabling the best solution to be selected. Solutions for paths are also extended by using smooth, continuous curvature paths, to allow an automated vehicle to drive paths without having to stop.

The present disclosure describes a multi-vehicle path planning and scheduling apparatus or system for non-holonomic automated vehicles. This apparatus been developed for use on automated vehicles (e.g., robots, automated forklifts and/or the like) for solving planning problems. Generally, non-holonomic (also referred to as anholonomic) include systems whose states are defined by paths that are used to arrive at the states.

Planning time and scalability are critical factors for functional systems. To help reduce search space and solution calculation time a constraint for the total number of automated vehicles in a multi-level node is introduced. This limits search complexity with little negative impact since automated vehicles do not generally need to occupy the same area in the warehouse. Fast planning times has allowed forecast plans to be generated. Forecasting allows the scheduling component to spend more time finding an optimal solution without impacting the current movement automated vehicles. Forecasting also provides a level of visibility for completion of orders and helps to ensure that automated vehicle utilization is efficient not only for the current task but for up-coming tasks as well.

Motivated by the flexible use of automated vehicles and the interaction with an environment (e.g., a warehouse), the present disclosure also describes coordinated path planning while allowing automated vehicles to drive on and/or off from a roadmap graph. This enables an automated vehicle to be turned on at any position and drive to the end of a path with enough accuracy to be able to correctly interact with the environment when carrying out tasks. Furthermore, because blocked paths can cause other path segments to also become blocked, preventing other automated vehicles from attempting to drive through that area improves resource utilization and saves a significant amount of travel time that would be otherwise wasted waiting for the area to clear or determining an alternate path that avoids the obstruction and the blocked path.

Figure 1:
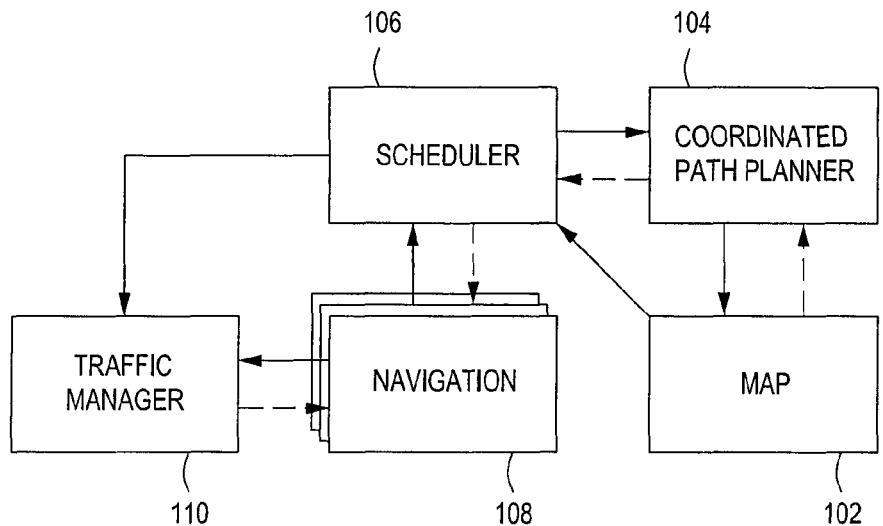
FIG. 1 is a functional block diagram illustrating an apparatus for efficient scheduling of automated vehicles using a map and implementing a coordinated path planner according to various embodiments.

FIG. 1 is a functional block diagram illustrating an apparatus 100 for efficient scheduling of automated vehicles using a map 102 and implementing a coordinated path planner 104 according to various embodiments. In addition to the coordinated path planner 104, the apparatus 100 implements various modules (e.g., software code, firmware, hardware components and/or the like), such as a scheduler 106, a navigation module 108 and a traffic manager 110.

In some embodiments, the scheduler 106 queries the coordinated path planner 104 with different possible solutions for one or more available automated vehicles (AVs) performing various available tasks. The scheduler 106 allocates these tasks to the automated vehicles more effectively by examining results of the possible solutions that are provided from the coordinated path planner 104. Once a decision is made as to which solution to execute, the scheduler 106 communicates a coordinated plan to the traffic manager 110 to manage and/or monitor the execution by the automated vehicles. The traffic manager 110 ensures that the automated vehicles perform the allocated tasks in accordance with the coordinated plan. Each automated vehicle includes the navigation module 108 for controlling vehicle movement (i.e., driving) and performing localization. The traffic manager 110 controls the travel distance based on a current execution state. As new information becomes available, such as changes to the map 102 or new tasks to consider, the scheduler 106 continues to find better solutions and reroute the automated vehicles along various paths.

Finding the best solution requires the scheduler 106 to query the coordinated path planner 104 regarding each and every possible solution for each of the available tasks by different automated vehicles. The scheduler 106 processes results for each solution and searches for the solution that closely satisfies the heuristic. A satisfactory run-time performance may be achieved by applying thresholds to the results and/or selecting the best solution within a given time period. Improving runtime performance prevents various problems, such as delays caused by idling, wasting of resources and/or missing deadlines.

The scheduler 106 forecasts future solutions based on information about up-coming tasks according to some embodiments. During planning for an automated vehicle, another automated vehicle moves to a location and blocks an area for an estimated amount of time while executing some aspect of a current task. Such an estimated amount of time is taken into account during path planning and scheduling. Once the time estimate elapses, the other automated vehicle may drive to a different location. As a result, task execution by the automated vehicle does not conflict with the execution of the current task by the other automated vehicle. Identifying and avoiding problematic situations (e.g., positions that are inescapable) improves time efficiencies and utilization in the long run.

In response to a query from the scheduler 106, the coordinated path planner 104 returns time estimates for each possible configuration of one or more automated vehicles. Various factors can influence each time estimate. For example, allocating an automated vehicle to a task may adversely impact other automated vehicles that are also completing tasks or are idle. Because starting idle automated vehicles costs time and resources (e.g., fuel), the scheduler 106 uses a heuristic that reflects such costs according to some embodiments. For example, the coordinated path planner 104 adds terms that represent costs for starting idle automated vehicles.

The apparatus 100 may perform coordinated path planning continuously or periodically. In some embodiments, as tasks become available over time, the coordinated path planning is subsequently performed instead of all at once due to calculation time and limited information. Optionally, whenever an event occurs, such as a new task or a change to the map 102, a current schedule becomes invalidated as there could potentially be a better solution. Scheduling, however, is not instantaneous and it would be inefficient to have the automated vehicles stop driving while a new plan is being calculated. In some embodiments, the scheduler 106 communicates a specific time to the traffic manager 110 after which the automated vehicles will stop; the traffic manager 110 also returns the estimated position of the automated vehicles at that time.

In the meantime, the scheduler 106 performs path planning and scheduling from this time with the updated event. When the time is expired, the scheduler 106 selects the best solution discovered thus far, assuming such a solution is within a pre-defined threshold and updates the current schedule. If the threshold is not met, then further planning is necessary. If the event does not change the immediate plan, the automated vehicles continue executing tasks seamlessly.

In an industrial environment (e.g., a warehouse), various areas will often become unavailable for transiting due a number of reasons, such as automated vehicle malfunction or an obstruction (e.g., an obstacle that is not included in the map 102). As explained in detail further below, because a size of the search space (e.g., a supergraph comprising each and every configuration of automated vehicles as explained further below) precludes making changes online whenever there are changes to the map 102, a list of blocked nodes are recorded instead. The coordinated path planner 104 examines such a list when performing path planning in order to stop different automated vehicles from path planning and/or navigating paths through these areas. If it is known that the same nodes are going to be blocked for a while, then the offline measurements against the heuristic are recalculated according to some embodiments.

Instead of using standard Dubins paths for non-holonomic automated vehicles, the coordinated path planner 104 modifies Dubins paths to add transitioning periods of constant change in curvature. A continuous change in curvature path is desired to allow the automated vehicle to drive accurately at a higher speed. In some embodiments, the apparatus 100 implements the modified Dubins paths by constructing graph segments and joining paths out of smooth paths. The joining paths can have sharper turns at the ends and smoother turns where the joining paths join the graph as the automated vehicle will be going faster once the automated vehicle hits the graph. Because of the extra space that these paths require, the joining of the joining paths need to be repeated with sharper path segments if the joining fail on smoother ones.

Figure 2:
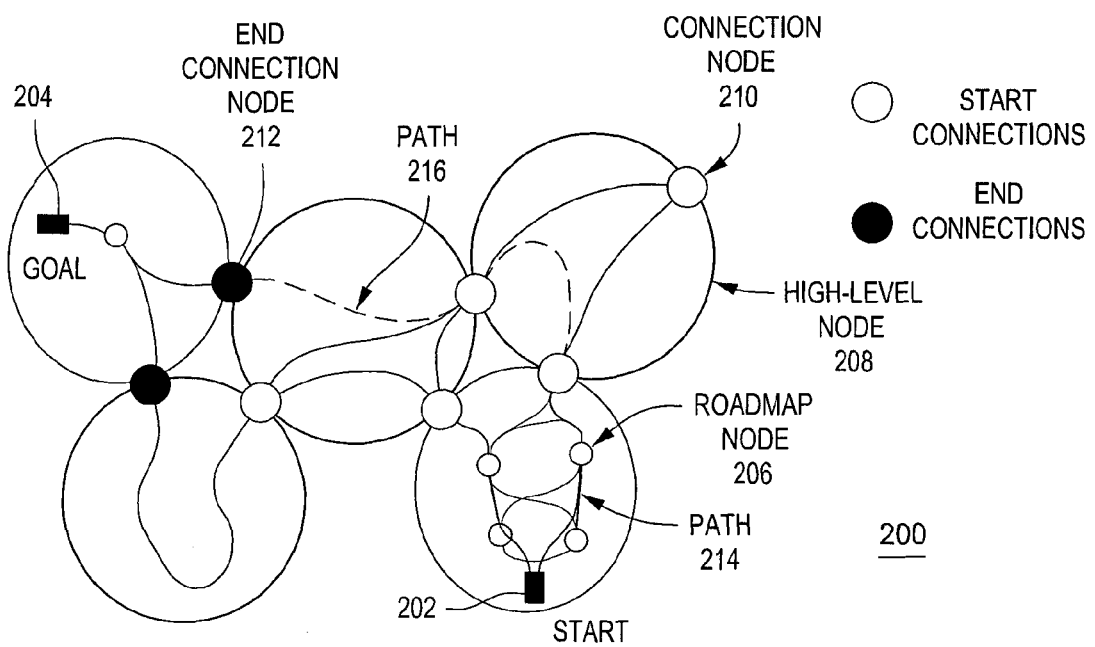
FIG. 2 illustrates a multi-level graph for performing coordinated path planning of an automated vehicle according to various embodiments.

FIG. 2 illustrates a multi-level graph 200 for performing coordinated path planning of an automated vehicle according to various embodiments. The coordinated path planner 104 considers each and every automated vehicle together as one composite unit with one or more degrees of freedom. Starting positions of the automated vehicles are one configuration of this unit and goal positions are another configuration. Each configuration may constitute a state in a non-holonomic system.

As illustrated, the multi-level graph 200 defines a start position 202 and a goal position 204 for the composite unit of one or more automated vehicles. A total number of possible configurations are limited by discretizing the multi-level graph 200 into a roadmap graph as explained in detail further below. The movement of the one or more automated vehicles may be represented as a series of configurations. Each configuration defines positions for the one or more automated vehicles, which may include one or more roadmap nodes, such as a roadmap node 206, one or more connection nodes on a high-level node, such as a high-level node 208. A configuration may correspond to another configuration when the one or more automated vehicles move between connected roadmap nodes as long as these movements do not result in a collision.

In some embodiments, the coordinated path planner 104 places various types of nodes throughout the map and then, joins these nodes using path segments forming a roadmap graph. The various types of nodes include, but are not limited to, the roadmap node 206, the high-level node 208, a connection node 210 and an end connection node 212. The path segments connecting various ones of the nodes include, but are not limited to, a path 214 and a path 216. The automated vehicles move from node to node along the path segments until the automated vehicles reach the goal position 204.

The coordinated path planner 104, in an offline process, forms high-level nodes using all of the possible combinations or configurations of the automated vehicles at different roadmap nodes. These high-level nodes are connected by moving one automated vehicle along a connected path segment to reach another high-level node. The coordinated path planner 104 uses various computation techniques (e.g., supergraph computation techniques) to remove any unfeasible solutions. In some embodiments, the high-level nodes and associated connections form a supergraph. Hence, the supergraph includes each and every automated vehicle configuration within the multi-level graph 200. By traversing the supergraph at runtime, the scheduler 106 searches for the best solution to path planning without having to do any intersection calculations, which were performed offline.

In some embodiments, the coordinated path planner 104 uses a heuristic for searching the multi-level graph 200 for the best solution (i.e., path). For example, the heuristic may be a travel time of automated vehicles between nodes. Estimates of travel times can be established offline and summed for all of the automated vehicles operating at a particular schedule. The coordinated path planner 104 repeats the path planning process leading to the selection of the best solution when compared with the heuristic.

In some embodiments involving large areas with several automated vehicles, the coordinated path planner 104 utilizes a multi-level graph, such as the multi-level graph 200, in order to reduce a size of a search space. The coordinated path planner 104 groups various nodes, such as roadmap nodes and connections nodes, into higher level nodes as illustrated. A solution is first found for a higher level portion of the multi-level graph 200, followed by a more specific solution for the next level down until a complete roadmap-level path is finalized.

The search space is further reduced by constraining the number of automated vehicles within high-level nodes. This constraint is possible given the industrial environment layouts which often can only effectively allow one or two automated vehicles in a given area. The multi-level graph 200 will result in a less optimal solution as it assumes the best high level search will contain the best lower level search, this is a tradeoff for calculation time. Measurements for evaluation against the heuristic may be computed offline for the multi-level graph 200.

In some embodiments with high vehicle traffic, the solution found by the coordinated path planner 104 will resolve such issues by requiring one or more automated vehicles to wait until other vehicles to pass specific locations. Such resolutions are noted in the plan as dependencies between vehicles with the corresponding locations. The traffic manager 110 interprets these dependencies while the solution is executed, and ensures the vehicles adhere to these dependencies when determining the distances vehicles are permitted to drive.

In some embodiments, the automated vehicles will not always start off or finish on a position on the path 216. This occurs when automated vehicles are manually driven and start anywhere within the known area or need to engage with items placed by human drivers who do not place items on the multi-level graph 200. To solve this problem, for each automated vehicle, a path from the start position to a node and a path from a node to the goal position 204 needs to be calculated. As long as there is sufficient coverage of the roadmap, then a Dubins path or similar path will suffice.

There may be several options of nodes to join, and the closest node may not necessarily be the optimum. An important advantage of the approach described in the present disclosure is that calculation speed allows determination of near optimum join locations. It may also be more efficient to join along a roadmap edge rather than at a node. In order to narrow down the joining possibilities for an automated vehicle, a grid can be calculated offline that will contain possible nodes that can be reached from within each grid square. At runtime the possible nodes are retrieved and a binary scan is performed along their connecting path segments to determine the best place to join. The top path segments are chosen as options for the search, the node at the end of the segment is used. These graph joining paths should be chosen such that they do not intersect the start/goal positions or the start/goal nodes of other automated vehicles, this will allow them to reach their initial node and leave their last node without causing a deadlock. Calculating the joiners does mean there will be some intersection calculations at run time but the areas are small and can be resolved quickly if the map 102 is broken down into a quad-tree.

Figure 3:
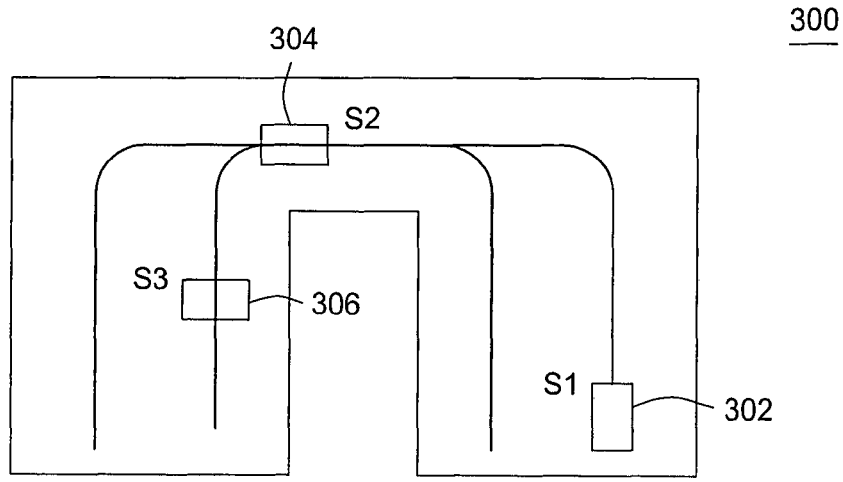
FIG. 3 is an exemplary roadmap graph illustrating a warehouse comprising automated vehicles according to various embodiments.

FIG. 3 is an exemplary roadmap graph 300 illustrating a warehouse comprising automated vehicles according to various embodiments.

The roadmap graph 300 depicts three automated vehicles whose task is to pick up items from a right side of a map and transport the picked up items to a left side according to some embodiments. A first automated vehicle 302 picks up an item, which must be returned to the other side of the warehouse. Subsequently, one of the other two automated vehicles is to come and pick up a next item on the right side. There are at least two solutions for the scheduler 106: use a second automated vehicle 304 or a third automated vehicle 306 to pick up the item. All of the possible solutions, along with moving the first automated vehicle 302 to the left, are communicated to the coordinated path planner 104 where paths with estimated times to completion are computed.

TABLE I

ESTIMATED TIMES USING DIFFERENT AUTOMATED VEHICLES

| | | Estimated Travel Times | | |
| --- | --- | --- | --- | --- |
| | | AV 302 | AV 304 | AV 306 |
| AV chosen for right pick up | AV 304 | 34.13 | 19.43 | 5.76 |
| | AV 306 | 36.30 | 10.11 | 44.74 |

The resulting time estimates are shown in Table I, the second automated vehicle 304 is favored for the task as it is closer and is blocking the corridor. This solution is described with respect to FIG. 4. Because starting up idle automated vehicles may be undesirable, a cost is applied to this activity in some embodiments. This solution is described with respect to FIG. 5.

In some embodiments, the coordinated path planner 104 and the scheduler 106 account for instances where an automated vehicle must wait for another automated vehicle. Wait positions and time estimates are computed for these instances and incorporated into path planning and scheduling, as described with respect to FIG. 4 and FIG. 5. Continuous curvature paths are used in FIGS. 4 and 5 on the roadmap graph and the joining paths. The joining paths are sharper at the ends as the automated vehicles are traveling slower.

Table II depicts estimated travel times for the first automated vehicle 302, the second automated vehicle 304 and the third automated vehicle 306 that take into account a time spent turning on an automated vehicle.

TABLE II

| Estimated Travel Times | | |
| --- | --- | --- |
| AV 302 | AV 304 | AV 306 |
| 39.78 | 19.43 | 0.00 |

Figure 4:
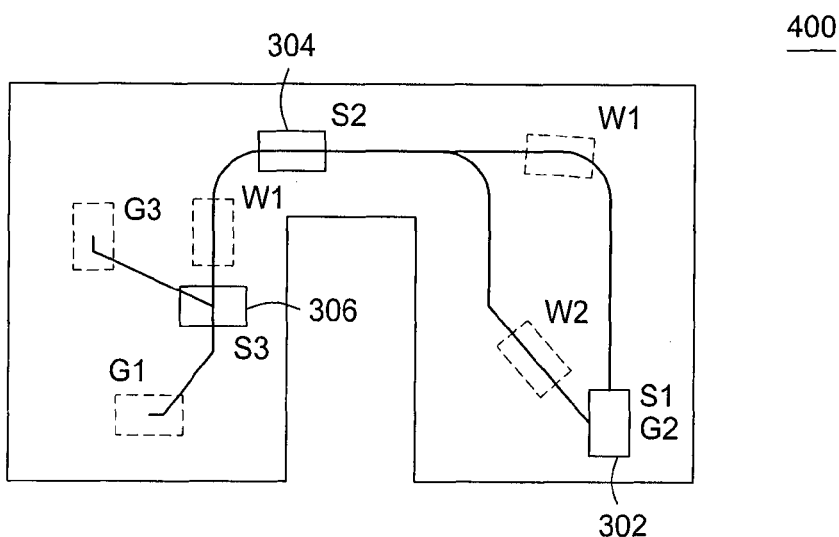
FIG. 4 is an exemplary roadmap graph depicting a scheduling solution for automated vehicles within a warehouse according to various embodiments.

FIG. 4 is an exemplary roadmap graph 400 depicting a solution for scheduling automated vehicles within a warehouse, such as the warehouse being depicted in FIG. 3, according to various embodiments. The first automated vehicle 302 commences the task at start position S1 (i.e., a rectangular area left of label "S1" on the roadmap graph 400) and picks up the item. The third automated vehicle 306 moves in order to complete the task as quickly as possible while the first automated vehicle 302 uses a joining path to reach a goal position G1 with two potential wait locations labeled W1.

As depicted on the roadmap graph 400, the start position S1 is also goal position G2 for the second automated vehicle 304. Accordingly, the second automated vehicle 304 moves to goal position G2 in order to pick up the next item with a wait location W2. In some embodiments, the first automated vehicle 302 stops and waits for the second automated vehicle 304 to move to the goal position G2 and/or waits for the third automated vehicle 306 to move to goal position G3. In some embodiments, the third automated vehicle 306 is located at start position S3 and constitutes an obstruction to the movement of the first automated vehicle 302 and must be moved out of the path. In other embodiments, the second automated vehicle 304 is located at start position S2. While moving to the goal position G2, the second automated vehicle 304 waits, at wait location W2, for the first automated vehicle 302 to leave an area around the goal position G2, which is also labeled the start position S1.

Figure 5:
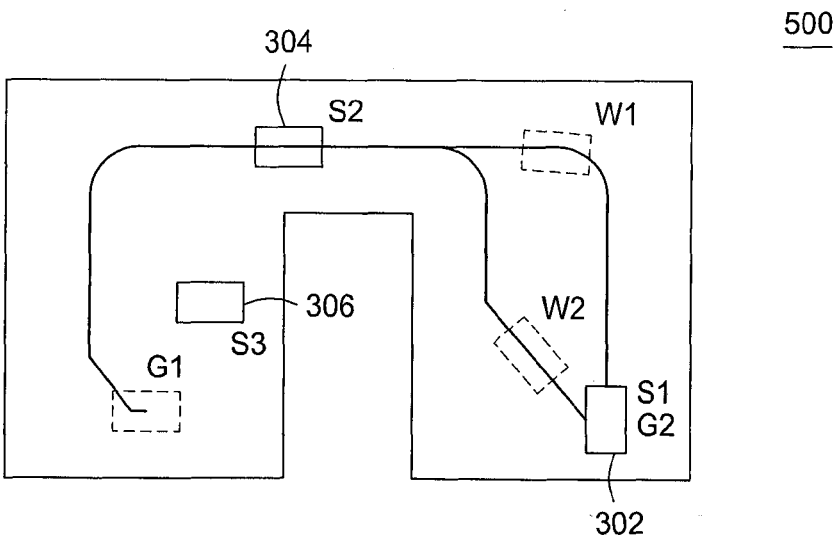
FIG. 5 is an exemplary roadmap graph depicting another scheduling solution for automated vehicles within a warehouse according to various embodiments.

FIG. 5 is an exemplary roadmap graph 300 depicting another solution for scheduling automated vehicles within a warehouse, such as the warehouse being depicted in FIG. 3, according to various embodiments. In some embodiments, the other solution differs from the solution depicted in FIG. 4 in several respects. For example, a coordinated path planner that is configured according to this solution assigns a higher cost for starting an automated vehicle. The first automated vehicle 302 commences the task at start position S1 and picks up the item. While the first automated vehicle 302 uses a joining path to reach a goal position G1 with a potential wait location labeled W1, the second automated vehicle 304 moves from start position S2 and moves to goal position G2, which is also the start position S1. Even though the first automated vehicle 302 has to travel slightly longer in time, the third automated vehicle 306 does not have to start up, which results in significant cost savings. The third automated vehicle 306 does not need to move from position S3 in order to complete the task as quickly as possible.

Figure 6A:
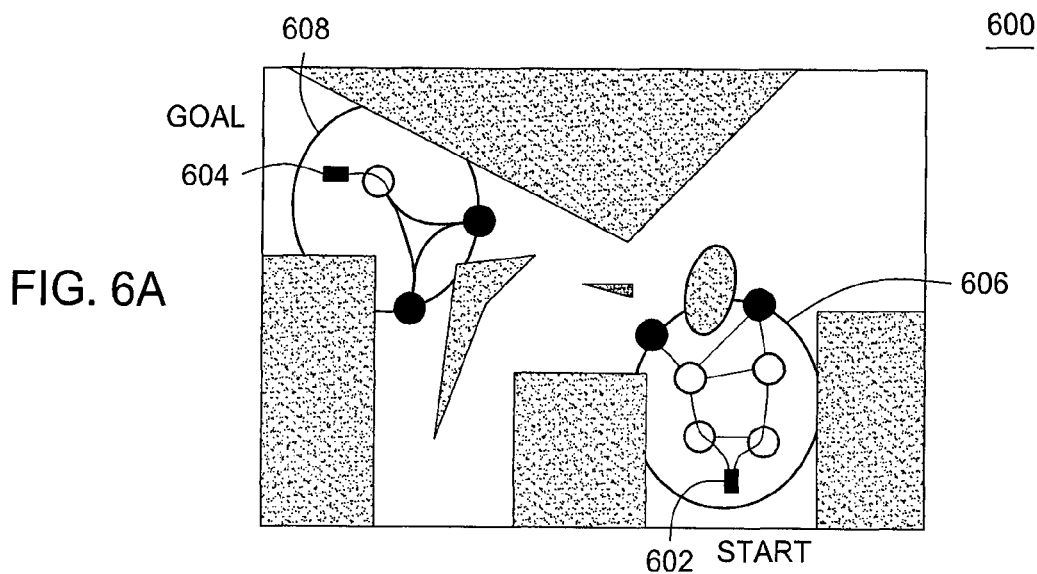
FIGS. 6A-C illustrate various levels of a multi-level graph for efficient scheduling of multiple non-holonomic automated vehicles using coordinated path planning according to various embodiments.
Figure 6B:
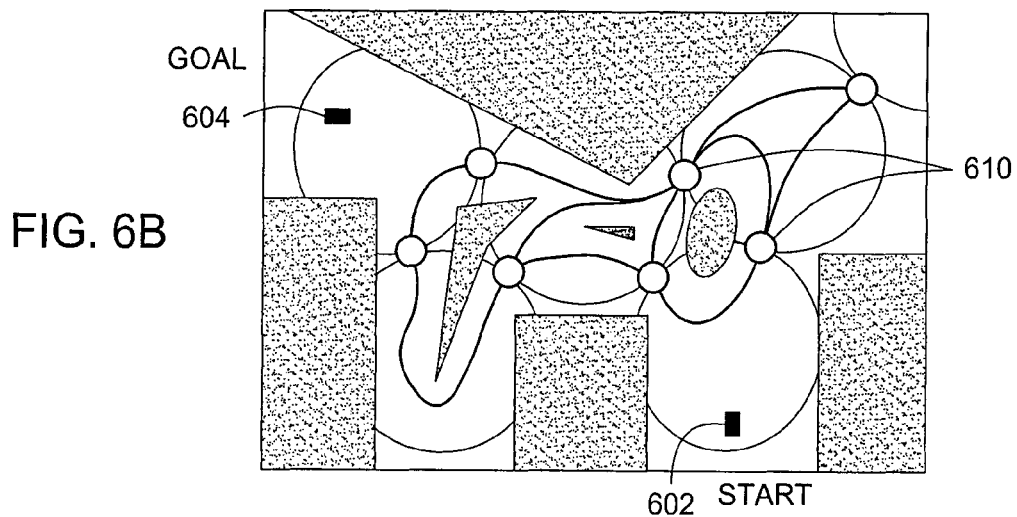
Figure 6C:
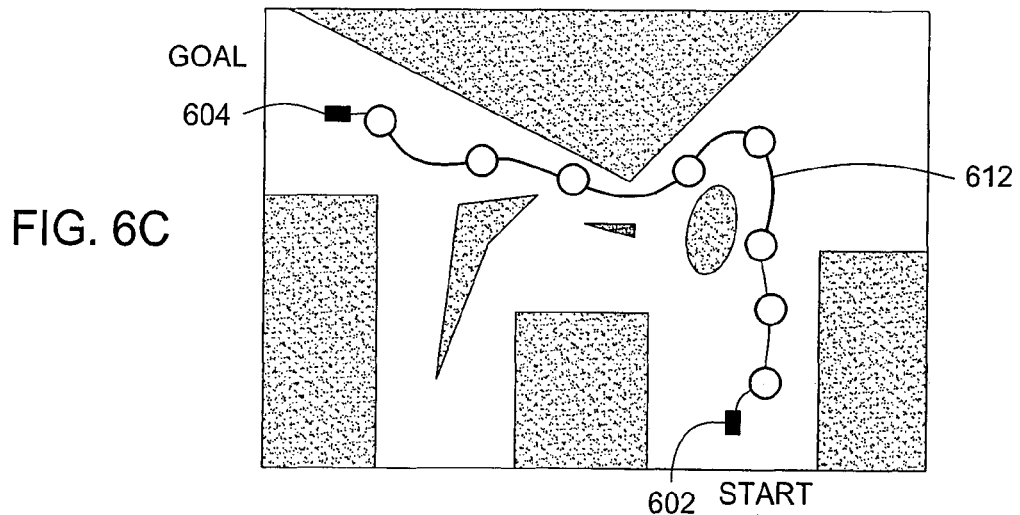

FIG. 6A-C illustrate various levels of a multi-level graph 600 for efficient scheduling of multiple non-holonomic automated vehicles using coordinated path planning according to various embodiments. FIGS. 6A-C depict path planning between a start position 602 and a goal position 604 by determining optimal local paths between various high-level nodes, such as a high-level node 606 and a high-level node 608. FIG. 6A and FIG. 6B may be referred to as high-level graphs and FIG. 6C may be referred to as a base roadmap graph. It is appreciated that several higher level graphs may be used for coordinated path planning. For example, larger environments may require more than two higher level graphs and one base roadmap graph.

In some embodiments, a coordinated path planner determines the optimal local paths between one or more connection nodes, which are nodes located on a periphery of the high-level nodes. The coordinated path planner may determine a path between connection nodes 610 as illustrated in FIG. 6B. Such an optimal local path may connect one or more roadmap nodes (e.g., the roadmap node 206 of FIG. 2), which are located inside each high-level node. In other embodiments, the coordinated path planner computes an optimal local path that does not go through at least one roadmap node.

Subsequently, a local path is determined between the start position 602 and a local connection node (e.g., a start connection node). In some embodiments, such a path includes one or more inner roadmap nodes. The coordinated path planner 104 may compute a second local path between the goal position 604 and a local connection node (e.g., an end connection node, such as the end connection node 212 of FIG. 2) in a similar manner. In some embodiments, the coordinated path planner combines the local paths to form a final path 612 on the multi-level graph 600 as illustrated in FIG. 6C. In some embodiments, the coordinated path planner 104 selects a lowest cost path that includes these local paths and high level paths to the local connection node associated with the goal position 604. Optimal high-level paths within the high-level node 606 and the high-level node 608 are then computed. These paths may not necessarily match with any portion of the lowest cost path because of various factors, such as other vehicles operating at or around a same time. Once the coordinated path planner 104 determines an optimal path at a lowest-level (i.e., a roadmap-level), the coordinated path planner 104 returns this result as the final path 612 according to one or more embodiments.

Figure 7:
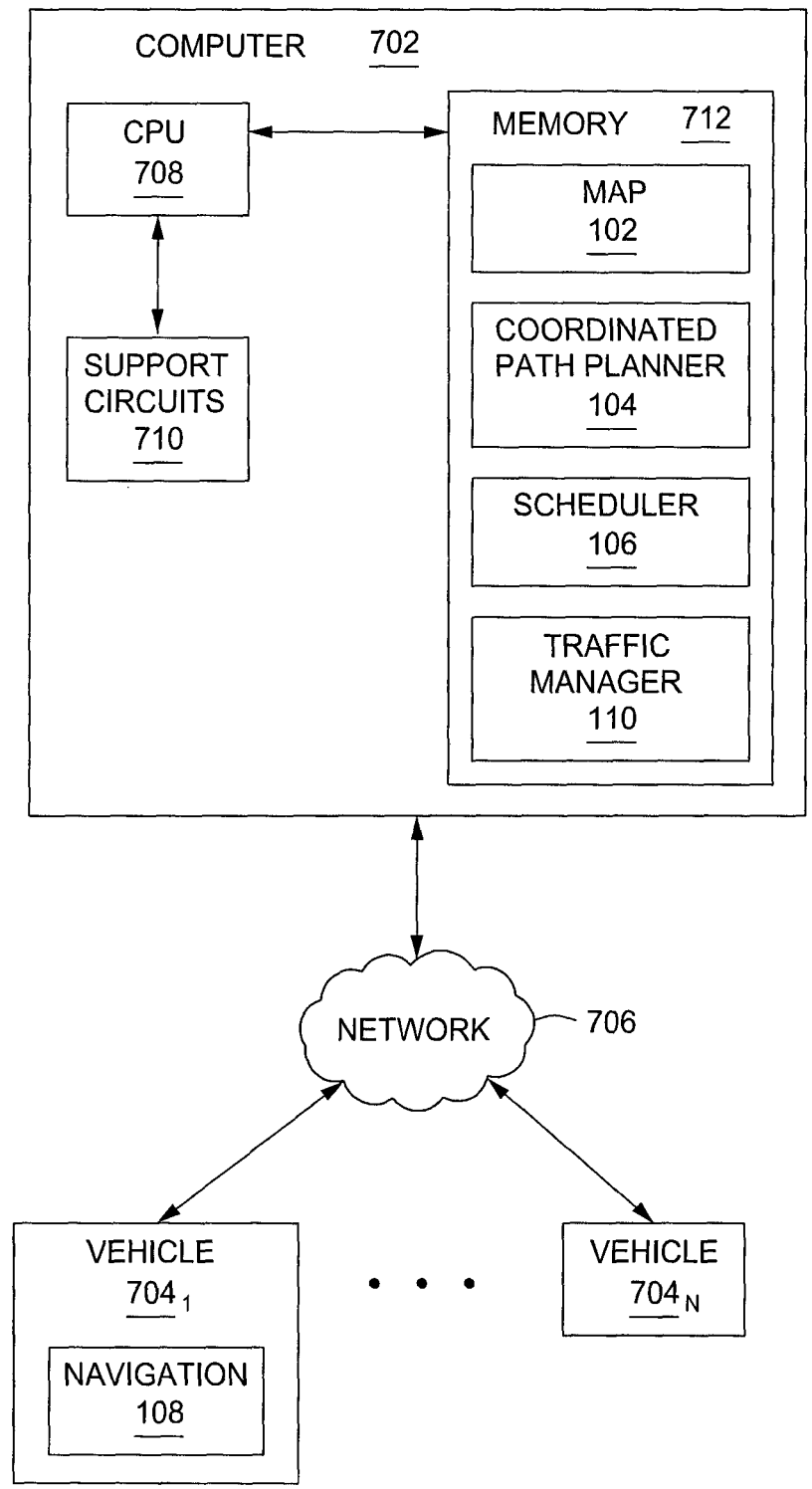
FIG. 7 is a block diagram illustrating a system for efficient scheduling and path planning of automated vehicles using a map and implementing a coordinated path planner according to various embodiments.

FIG. 7 is a structural block diagram of a system 700 for efficient scheduling for multiple automated non-holonomic vehicles using a coordinated path planner, such as the coordinated path planner 104, according to one or more embodiments. In some embodiments, the system 700 includes a computer 702 and a plurality of vehicles 704 (illustrated as a vehicle $704_1$ ... a vehicle $704_N$) in which each component is coupled to each other through a network 706. Each of the plurality of vehicles 704 includes a navigation module, such as the navigation module 108, for operating various vehicle components, such as steering and/or motion components. It is appreciated that the plurality of vehicles 704 may utilize one or more computers for executing the navigation module 108.

The computer 702 is a type of computing device (e.g., a laptop, a desktop, a Personal Desk Assistant (PDA) and the like). Each of the vehicles 704 includes a type of computing device (e.g., a laptop computer, a desktop computer, a Personal Desk Assistant (PDA) and the like). A computing device, generally, comprises a central processing unit (CPU) 708, various support circuits 710 and a memory 712. The CPU 708 may comprise one or more commercially available microprocessors or microcontrollers that facilitate data processing and storage. Various support circuits 710 facilitate operation of the CPU 708 and may include clock circuits, buses, power supplies, input/output circuits and/or the like. The memory 712 includes a read only memory, random access memory, disk drive storage, optical storage, removable storage, and the like. The memory 712 includes various data, such as the map 110, as well as various software packages, such as the coordinated path planner 104, the schedule 106 and the navigation module 108. These software packages implement an apparatus, such as the apparatus 100 of FIG. 1, for efficient scheduling of the automated vehicles 704.

In some embodiments, the coordinated path planner 104 includes software code (e.g., processor executable instructions) that is executed by the CPU in order to respond to queries from the scheduler 106 as described in the present disclosure. The coordinated path planner 104 determines time estimates for each and every possible solution for completing a task. These time estimates are used for evaluating the possible solutions. In some embodiments, the scheduler 106 selects a solution for scheduling the automated vehicles 704 evaluated against a heuristic. The scheduler 106 communicates instructions (e.g., a schedule) to the traffic manager 110, which uses the navigation module 108 to control automated vehicle operations and movements.

The network 706 comprises a communication system that connects computers by wire, cable, fiber optic, and/or wireless links facilitated by various types of well-known network elements, such as hubs, switches, routers, and the like. The network 706 may employ various well-known protocols to communicate information amongst the network resources. For example, the network 706 may be part of the Internet or intranet using various communications infrastructure such as Ethernet, WiFi, WiMax, General Packet Radio Service (GPRS), and the like.

While the foregoing is directed to embodiments of the present invention, other and further embodiments of the invention may be devised without departing from the basic scope thereof, and the scope thereof is determined by the claims that follow.

The invention claimed is:

1. A method for coordinating path planning for a plurality of automated vehicles, the method comprising:

receiving, through a network and with one or more central processing units, an executable task in an industrial environment for one of the plurality of automated vehicles wherein respective automated vehicles comprise a navigation module, a steering component, and a motion component, and the central processing units are communicatively coupled to the plurality of automated vehicles through the network;

providing a multi-level graph comprising high-level nodes, wherein respective high level nodes correspond to a region of the industrial environment, each of the high-level nodes comprises one or more connection nodes corresponding to a boundary of the region, one or more roadmap nodes corresponding to an interior of the region, and one or more local paths that link the connection nodes, the roadmap nodes, or a combination thereof;

constructing, with the central processing units, a grid associated with the industrial environment, wherein the grid demarcates a plurality grid squares and respective grid squares contain a portion of the industrial environment and a portion of the corresponding multi-level graph;

selecting from the plurality of grid squares, with the central processing units, grid squares corresponding to a start position, a goal position, or both, if the start position, the goal position, or both, are within the industrial environment but off the multi-level graph;

determining within respective ones of the selected grid squares, with the central processing units, joining paths from the start position, the goal position, or both, to the multi-level graph;

constructing, with the central processing units, a solution set of roadmap graphs from the multi-level graph, wherein each of the roadmap graphs comprises the start position linked via a final path to the goal position, and wherein the final path comprises a determined joining path and at least a portion of the local paths;

selecting, with the central processing units, a coordinated path plan for the automated vehicles from the solution set of roadmap graphs; and communicating, through the network, at least a portion of the coordinated path plan to each automated vehicle wherein the navigation module of each of the automated vehicle operates the steering component, the motion component, or both according to the coordinated path plan.

2. The method of claim 1, further comprising removing at least a portion of the roadmap graphs from the solution set of roadmap graphs based at least in part upon the heuristic of each of the portion of the roadmap graphs.

3. The method of claim 1, further comprising constraining a number of the automated vehicles permitted within each of the high-level nodes to reduce the time needed to construct a solution set of roadmap graphs.

4. The method of claim 3, wherein the number of the automated vehicles permitted within each of the high-level nodes is two or less.

5. The method of claim 1, further comprising:

stopping operation of the automated vehicles at a predetermined time; and resuming operation of the automated vehicles after a period of time has elapsed after the predetermined time, wherein the coordinated path plan is selected during the period of time.

6. The method of claim 1, further comprising:

generating a list of blocked nodes corresponding to the high-level nodes, the connection nodes, and roadmap nodes that are unavailable; and stopping the automated vehicles from navigating a part of the region corresponding the blocked nodes.

7. The method of claim 1, further comprising forming a modified-Dubins path comprising joining paths at ends of the modified-Dubins and a continuous change in curvature path located between the joining paths, wherein the modified-Dubins path comprises sharper turns than the continuous change in curvature path, and wherein the one or more local paths of one of the roadmap graphs comprises the modified-Dubins path.

8. The method of claim 1, wherein the joining path does not intersect with the start position and the goal position of each of the roadmap graphs for another automated vehicle.

9. The method of claim 1, wherein the coordinated path plan requires one of the automated vehicles to wait until another of the one or more automated vehicles passes a specific location.

10. The method of claim 1, wherein the heuristic is indicative of travel time.

11. The method of claim 1, wherein the heuristic is indicative of cost associated with start-up of an idled vehicle of the automated vehicles.

12. The method of claim 1, wherein the heuristic is indicative of the high-level nodes, the connection nodes, and roadmap nodes that are unavailable.

13. The method of claim 1, wherein the automated vehicles are non-holonomic.

14. The method of claim 1, further comprising identifying, with the central processing units, respective connection nodes, roadmap nodes, or local paths which correspond to the start position, the goal position, or both, if the start position, the goal position, or both are within the industrial environment and on the multi-level graph.

15. The method of claim 1, further comprising associating, with the central processing units, a heuristic with each of the roadmap graphs, wherein the heuristic is indicative of the final path of its associated roadmap graph, wherein the coordinated path plan is selected based at least in part upon the heuristic.

16. A system for coordinating path planning in a warehouse, the system comprising:
   a plurality of automated vehicles located within the warehouse, each of the automated vehicles comprising a navigation module in communication with a steering component and a motion component; and
   one or more central processing units in communication with each of the automated vehicles, wherein the one or more central processing units execute instructions to:
      receive an executable task for one of the plurality of automated vehicles;
      access a multi-level graph comprising high-level nodes, wherein respective high level nodes correspond to a region of the warehouse, each of the high-level nodes comprises one or more connection nodes corresponding to a boundary of the region of the warehouse, one or more roadmap nodes corresponding to an interior of the region of the warehouse, and one or more local paths that link the connection nodes, the roadmap nodes, or a combination thereof;
      construct a grid associated with the warehouse, wherein the grid demarcates a plurality grid squares and respective grid squares contain a portion of the warehouse and a portion of the corresponding multi-level graph;
      select from the plurality of grid squares, grid squares corresponding to a start position, a goal position, or both, if the start position, the goal position, or both are within the warehouse but off the multi-level graph;
      determine within respective ones of the selected grid squares, joining paths from the start position, the goal position, or both, to the multi-level graph;
      construct a solution set of roadmap graphs from the multi-level graph, wherein each of the roadmap graphs comprises the start position linked via a final path to the goal position, and wherein the final path comprises a determined joining path and at least a portion of the local paths;
      select a coordinated path plan for the automated vehicles from the solution set of roadmap graphs; and
      communicate at least a portion of the coordinated path plan to each of the automated vehicles, wherein the navigation module of each of the automated vehicles controls the steering component, the motion component, or both according to the coordinated path plan.

17. The system of claim 16, wherein the one or more central processing units execute the instructions to:
   generate a list of blocked nodes corresponding to the high-level nodes, the connection nodes, and roadmap nodes that are unavailable; and
   stop the automated vehicles from navigating a part of the region of the warehouse corresponding the blocked nodes.

18. The system of claim 16, wherein the one or more central processing units execute the instructions to form a modified-Dubins path comprising joining paths at ends of the modified-Dubins and a continuous change in curvature path located between the joining paths, wherein the modified-Dubins path comprises sharper turns than the continuous change in curvature path, and wherein the one or more local paths of one of the roadmap graphs comprises the modified-Dubins path.

19. The system of claim 16, wherein the joining path does not intersect with the start position and the goal position of each of the roadmap graphs for another automated vehicle.

20. The system of claim 16, wherein the coordinated path plan requires one of the automated vehicles to wait until another of the automated vehicles passes a specific location.

21. A method for coordinating path planning for a plurality of automated forklifts, wherein the automated forklifts are located within a warehouse and in communication with one or more central processing units, and wherein the method comprises:
   receiving, with the central processing units, an executable task in an industrial environment for one of the plurality of automated forklifts wherein respective automated forklifts comprise a navigation module, a steering component, and a motion component;
   providing a multi-level graph comprising high-level nodes, wherein respective high level nodes correspond to a region of the warehouse, each of the high-level nodes comprises one or more connection nodes corresponding to a boundary of the region of the warehouse, one or more roadmap nodes corresponding to an interior of the region of the warehouse, and one or more local paths that link the connection nodes, the roadmap nodes, or a combination thereof;
   constructing, with the central processing units, a grid associated with the warehouse, wherein the grid demarcates a plurality grid squares and respective grid squares contain a portion of the warehouse and a portion of the corresponding multi-level graph;
   selecting from the plurality of grid squares, with the central processing units, grid squares corresponding to a start position, a goal position, or both, if the start position, the goal position, or both, are within the warehouse but off the multi-level graph;

determining within respective ones of the selected grid squares, with the central processing units, joining paths from the start position, the goal position, or both to the multi-level graph;

constructing, with the central processing units, a solution set of roadmap graphs from the multi-level graph, wherein each of the roadmap graphs comprises the start position linked via a final path to the goal position, and wherein the final path comprises a determined joining path and at least a portion of the local paths;

selecting, with one or more central processing units, a coordinated path plan for the automated forklifts from the solution set of roadmap graphs; and communicating, through the network, at least a portion of the coordinated path plan to each automated forklift wherein the navigation module of each of the automated forklift controls the steering component, the motion component, or both according to the coordinated path plan.

* * * * *